(No Model.)
J. PEARCE.
VEHICLE WHEEL.
No. 259,712. Patented June 20, 1882.
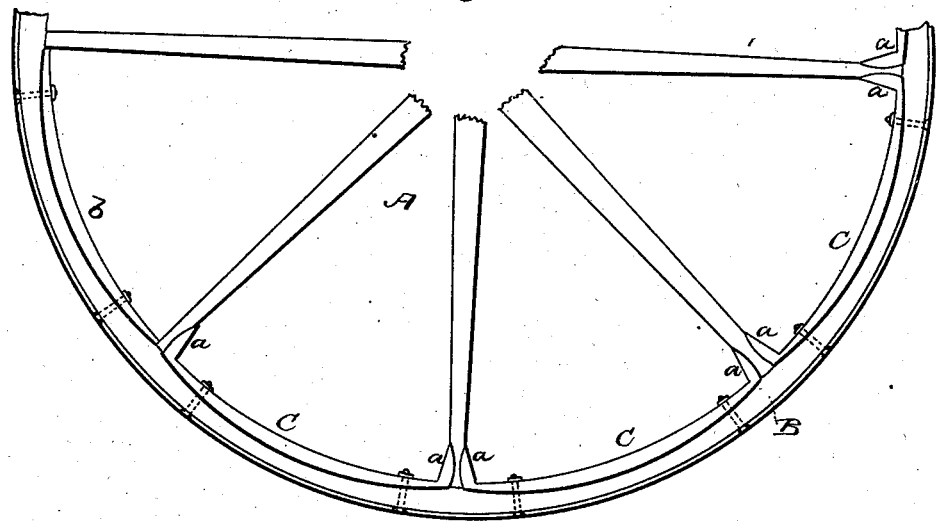
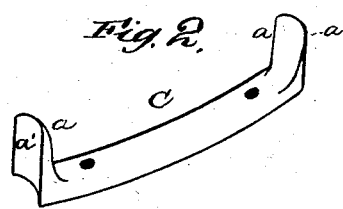
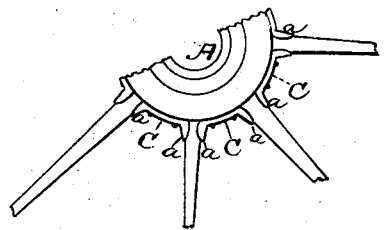
WITNESSES
James J. Sheehy
Philip C. Masi
INVENTOR
Jefferson Pearce
By Wm. H. Bates and Co.
ATTORNEYS
N. PETERS, Photo-Lithographer, Washington, D. C.

UNITED STATES PATENT OFFICE.

JEFFERSON PEARCE, OF NORTH LANSING, MICHIGAN.

VEHICLE-WHEEL.

SPECIFICATION forming part of Letters Patent No. 259,712, dated June 20, 1882.

Application filed April 19, 1882. (No model.)

*To all whom it may concern:*

Be it known that I, JEFFERSON PEARCE, a citizen of the United States, residing at North Lansing, in the county of Ingham and State of Michigan, have invented certain new and useful Improvements in Vehicle-Wheels, of which the following is a specification, reference being had therein to the accompanying drawings.

This invention has relation to improvements in vehicle-wheels; and it consists in the novel construction and arrangement of a plate having upward projections at either end thereof, designed to partly encircle the spokes, whereby the fellies of a wheel are braced and strengthened, all of which will be hereinafter more fully explained.

The annexed drawings, to which reference is made, fully illustrate my invention, in which Figure 1 represents a side view of part of a vehicle-wheel having my improvement attached, and Fig. 2 represents a perspective view of one of the bracing-plates. Fig. 3 is also a side view of part of a wheel.

The letter A designates an ordinary vehicle-wheel, and B is the rim or fellies.

C indicates the bracing and strengthening plates, which are provided at either end with upwardly-projecting lugs $a$, having on their outer faces concaves $a'$, which are designed to partly encircle the spokes and brace them, while the plate proper strengthens the fellies.

It will thus be seen by the foregoing description that I construct a felly-plate that extends from spoke to spoke, and am thus enabled to dispense with a number of spokes now used in vehicle-wheels, at the same time obtaining strength to the wheel; also, it will be observed that a wheel constructed as herein described is very light, yet strong and durable, and lessening the number of spokes that otherwise weaken a wheel in or at the hub. Again, should it be desirable the upwardly-projecting lugs may be dispensed with and the plate used, as shown at $b$ in the drawings.

Having described my invention, what I claim, and desire to secure by Letters Patent, is—

The plate constructed as shown and described, the body A, extending from spoke to spoke, snugly fitting the intersection of the same and the fellies, and provided at its ends with upwardly-extended right-angular lugs, concaved on their outer faces to conform to the shape of the spokes, for the purpose specified.

In testimony whereof I affix my signature in presence of two witnesses.

JEFFERSON PEARCE.

Witnesses:
  M. B. CARPENTER,
  B. S. HATALING.